United States Patent [19]

Nozawa et al.

[11] Patent Number: 4,514,813
[45] Date of Patent: Apr. 30, 1985

[54] SYSTEM FOR CORRECTING POSITIONAL ERROR IN NUMERICAL CONTROL DEVICES

[75] Inventors: Ryoichiro Nozawa, Tokyo; Hideaki Kawamura, Hachioji, both of Japan

[73] Assignee: Fanuc Ltd., Minamitsuru, Japan

[21] Appl. No.: 305,785

[22] Filed: Sep. 25, 1981

[51] Int. Cl.$^3$ ............... G06F 15/46; G06F 11/00; G05B 19/24

[52] U.S. Cl. .................. 364/474; 318/570; 364/170

[58] Field of Search ........... 364/474, 468, 168, 170, 364/184; 318/569, 570, 572, 574, 600, 563, 565; 371/1

[56] References Cited

U.S. PATENT DOCUMENTS

| 3,422,325 | 1/1969 | Gerber | 318/574 |
| 3,538,315 | 11/1970 | Reuteler | 318/574 |
| 3,551,656 | 12/1970 | Wohlfeil | 318/574 |
| 3,555,254 | 1/1971 | Gerber | 318/575 |
| 3,749,995 | 7/1973 | Leenhouts | 318/574 |
| 3,864,613 | 2/1975 | Cutler | 318/574 |
| 3,941,988 | 3/1976 | Hagstrom | 364/474 |
| 4,135,238 | 1/1979 | Hamill, III et al. | 318/574 |

FOREIGN PATENT DOCUMENTS

1142774 2/1969 United Kingdom .
1398851 6/1975 United Kingdom .

Primary Examiner—James D. Thomas
Assistant Examiner—William G. Niessen
Attorney, Agent, or Firm—Staas & Halsey

[57] ABSTRACT

A positional error correction system applicable to a numerical control for controlling a machine tool along more than one control axis, such as along X and Y control axes. If the machine tool is to be positionally controlled along the X-axis, the position of the machine tool along the X-axis is corrected by a correction factor which is a function of the position of the machine tool along that axis and the position of the machine tool along the Y-axis, thus providing highly accurate position correction. The position error correction system is not restricted to merely the X and Y axes and can include control of a Z-axis. In such a case the positional correction is performed using a correction factor which is a function of the machine tool position along all three axes.

8 Claims, 3 Drawing Figures

SYSTEM FOR CORRECTING POSITIONAL ERROR IN NUMERICAL CONTROL DEVICES

BACKGROUND OF THE INVENTION

This invention relates to a system for correcting a positional error in a numerical control device of the type used to control a machine tool.

When controlling the feed of a workpiece table in a machine tool such as a lathe, positional errors stemming from such mechanical phenomena as pitch error and backlash occur. A numerical control device ordinarily is furnished with pitch error and backlash correction functions that the numerical control device relies upon to correct positional errors when controlling a machine tool. One method of correcting pitch error is disclosed in Japanese Patent Application Laid-Open No. 50-63381 published May 29, 1975, in which the correction is effected by purely electrical means. Specifically, a mechanically movable body has several socalled control axes along which the body can be moved. The body may, for example, be capable of movement along the X and Y axes. In the aforesaid method, the range of movement along each axis is divided into a plurality of segments. For example, the movable range of the body along the X-axis is divided into $AX_i$ segments (where $i=1, 2, \ldots$), and pitch error correction factors $EX_i$ ($i=i, 2, \ldots$) are stored in memory so as to correspond to each of said segments. Then, when the movable body is moved along the X-axis so that the current position of the body lies on a prescribed segment $EX_i$, the pitch error correction factor $EX_i$ corresponding to that segment is read out of the memory, the current position of the body along the X-axis being corrected on the basis of the correction factor $EX_i$ and the direction of movement, i.e., in the plus or minus direction. This method enables the correction along the X-axis to be effected in a highly accurate manner without requiring such mechanical elements as dogs and limit switches.

A characteristic of the aforesaid conventional pitch error correction system is that the pitch error correction factor for a correction along one control axis, such as the correction factor $EX_i$ for the X-axis, depends solely upon the current position of the movable body on said axis and is independent of the current position along the other axes, such as the Y-axis in the above example. In other words, in the foregoing correction system, pitch error correction factors $E_x$, $E_y$, $E_z$ for corrections along the respective X, Y and Z axes are expressed as follows: $E_x = f_x(x)$, $E_y = f_y(y)$, $E_z = f_z(z)$. This means that a highly precise positional correction cannot be performed with the conventional system described above in a case where the pitch error correction factor for a certain control axis depends not only upon the current position along said control axis, but upon the current position of the movable body along the other control axes as well.

SUMMARY OF THE INVENTION

Accordingly, an object of the present invention is to provide a positional error correction method for accurate correction of pitch error in a numerically controlled machine tool even when the pitch error correction factor for correction along a specific control axis depends not only upon the current position of a movable body along said control axis but upon the current position of the movable body along the other control axes as well.

Another object of the present invention is to provide an error correction apparatus in a numerical control system, provided with a function which enables an accurate pitch error correction even when the pitch error correction factor for a specific control axis of a numerically controlled machine tool depends not only upon the current position of a movable body along said control axis, but upon the current position of the movable body along the other control axes of the machine tool.

In accordance with one aspect of the present invention, a method of positionally correcting a movable body whose movement is controlled along at least two control axes is achieved by correcting the position of the movable body along one control axis by means of a correction factor decided on the basis of the position along said control axis and the position along the other control axis or axes.

In accordance with another aspect of the present invention, a numerical control system, which is adapted to control a machine tool having a movable body whose movement is controlled along at least two control axes, is provided with an error correction circuit for producing a correction factor decided on the basis of the position of the movable body along one control axis, i.e., the axis along which the machine tool is being positionally controlled, as well as the position of the movable body along the other control axis or axes, the error correction circuit delivering an output signal, indicative of the correction factor, at the time of a positional control operation along said one control axis, thereby to correct the positional error of the machine tool.

Other features and advantages of the present invention will be apparent from the following description taken in conjunction with the accompanying drawings.

DESCRIPTION OF THE PREFERRED EMBODIMENT

Figure 1:
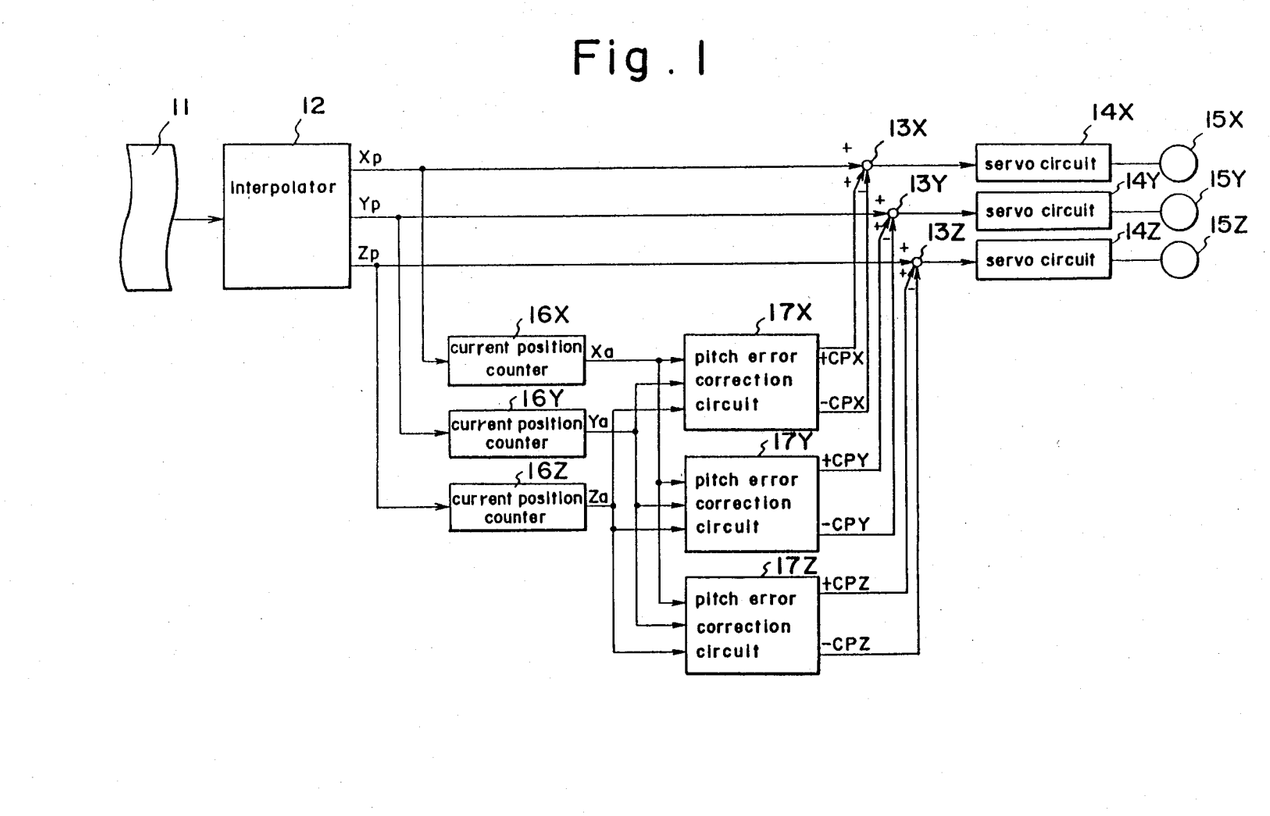
FIG. 1 is a block diagram illustrating an error correction system in accordance with the present invention.

Referring first to FIG. 1, there is shown an interpolator 12 which produces distributed pulses $X_p$, $Y_p$, $Z_p$ by performing a pulse distribution operation on the basis of movement commands received from a paper tape 11 bearing a punched machining program. Pulse mixing circuits 13X, 13Y, 13Z receive the distributed pulses $X_p$, $Y_p$, $Z_p$ from the interpolator 12 and mix them with corrective pulses $X_c$, $Y_c$, $Z_c$, respectively, which will be described below. Well-known servo circuits 14X, 14Y, 14Z, which receive the outputs of the respective pulse mixing circuits 13X, 13Y, 13Z, have their outputs connected to respective servo motors 15X, 15Y, 15Z. Current position counters 16X, 16Y, 16Z, which are reversible counters, are adapted to count up or to count down the respective distributed pulses $X_p$, $Y_p$, $Z_p$ in accordance with the sign thereof, the value of the count within each counter indicating the commanded current position of a movable body along the X, Y, and Z axes, the commanded current position meaning the position currently occupied by the movable body as a result of the command received by the interpolator 12. In other words, the counters 16X, 16Y, 16Z store the commanded current positions $X_a$, $Y_a$, $Z_a$ along the aforesaid three axes, of the movable body, these values being delivered to pitch error correction circuits 17X, 17Y, 17Z, respectively, which generate corrective pulses, for example +CPX, −CPX, for corrections along the three axes X, Y, Z. Here we will assume that the pitch error along the X-axis is dependent upon the current position of the movable body along the X-axis and along the Y and Z axes as well, that the pitch error along the Y-axis is dependent upon the current position of the movable body along the Y-axis and along the X and Z axes as well, and that the pitch error along the Z-axis is dependent upon the current position of the movable body along Z-axis and along the X and Y axes as well. The pitch error correction factors $E_x$, $E_y$, $E_z$ for each of these axes may then be expressed as follows:

$E_x = f_x(x_a, y_a, z_a)$ $E_y = f_y(x_a, y_a, z_a)$ $E_z = f_z(x_a, y_a, z_a)$

Figure 2:
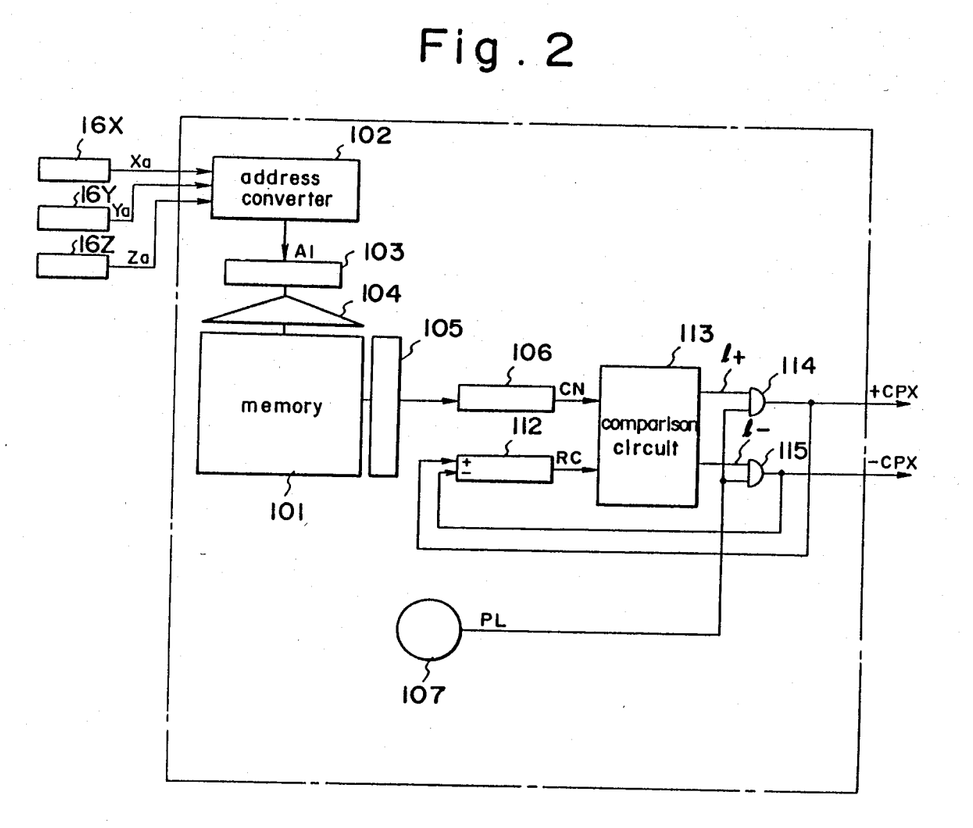
FIG. 2 is a block diagram illustrating an embodiment of a pitch error correction circuit in accordance with the present invention.

The pitch error correction circuits 17X, 17Y, 17Z have identical circuit configurations, one of the circuits being shown in FIG. 2.

The pitch error correction circuit (17X in FIG. 1) shown in FIG. 2 includes a memory 101 for storing corrective values. The memory 101 is adapted to store, in the form of a three-dimensional matrix, so-called "absolute" corrective values which correspond to respective sub-regions of space obtained by dividing three-dimensional space into a multiplicity of smaller regions, i.e., "sub-regions". An address converter 102 converts the current position (a point defined by $X_a$, $Y_a$, $Z_a$) of the movable body into an address of the location in the memory 101 which stores the corrective value corresponding to the sub-region to which said current position belongs. An address register 103 stores the address obtained from the address converter 102. A decoder 104 is disposed between the memory 101 and the address register 103. The memory 101 is connected to a read control circuit 105 which is in turn connected to a presettable register 106 in which a corrective value CN read out of the memory 101 is preset. Numeral 107 denotes an oscillator for generating pulses PL whose function will be described below. A reversible counter 112 has its content up-counted by +1 each time a positive corrective pulse +CPX is generated, for a correction in the positive direction and down-counted each time a negative corrective pulse −CPX is generated for a correction in the negative direction. This will be described in further detail below. A comparator circuit 113 compares the content CN of the register 106 and the content RC of the reversible counter 112 and delivers logical "1" on line 1+ when CN>RC holds, logical "1" on line 1− when CN <RC holds, and logical "0" on both lines 1+, 1− when CN=RC holds, i.e., when CN and RC coincide. AND gates are designated at numerals 114, 115. When CN>RC holds, AND gate 114 delivers, as the positive corrective pulses +CPX, pulses PL which are generated by the oscillator 107. When RC<CN holds, AND gate 115 delivers the pulses PL from the oscillator 107 as the negative corrective pulses −CPX. It should be noted that the pitch error correction circuits 17X through 17Z are identically constructed as mentioned above. The sub-regions of space may differ from one another, however, as may the corrective values assigned to them and stored in memory 101.

A pitch error correction in accordance with the present invention proceeds as follows. The interpolator 12, upon receiving a movement command specified by the paper tape 11, performs a pulse distribution operation and feeds distributed pulses $X_p$, $Y_p$, $Z_p$ to the servo circuits 14X, 14Y, 14Z through the pulse mixing circuits 13X, 13Y, 13Z, the servo circuits responding by driving the servo motors 15X, 15Y, 15Z rotatively. The servo motors rotate table drive lead screws which in turn transport the machine tool table along the X, Y and Z axes. The distributed pulses $X_p$, $Y_p$, $Z_p$, in accordance with the foregoing operation, enter the respective current position counters 16X, 16Y, 16Z which store the commanded current position of the table in terms of the values $X_a$, $Y_a$, $Z_a$ along each of the control axes. This is accomplished by up-counting or down-counting the distributed pulses in accordance with their sign. The values $X_a$, $Y_a$, $Z_a$ specifying the commanded current position of the table enter each one of the pitch error correction circuits 17X through 17Z. Referring to FIG. 2, the address converter 102, found in each pitch error correction circuit, converts the current table position into an address $A_i$ which conforms to the sub-region of space to which the current table position belongs, the address $A_i$ then being set in the address register 103. When the current table position changes from one sub-region of space to the next sub-region, therefore, the address corresponding to the latter sub-region is set in the address register 103. When this has been accomplished, the address register 103 addresses the memory 101 by specifying the address $A_i$. The read control circuit 105 reads the corrective value at said address from the memory 101 and sets it in the register 106. The comparator 113 constantly compares the content CN of register 106 with the content RC of the reversible counter 112. The inputs CN and RC to the comparator 113 become unequal when the corrective value from memory 101 is set in the register 106. If we assume that the corrective value set in register 106 establishes the inequality CN>RC, then the coincidence circuit 113 delivers logical "1" on line 1+, thereby opening AND gate 114. As a result, pulses PL generated by the oscillator 107 pass through the open AND gate 114 and are delivered as the corrective pulses +CPX for a forward correction. The pulses simultaneously enter the reversible counter 112 and increment its content RC until the equality CN=RC is established, at which time the comparator 113 detects the coincidence between CN and RC to close AND gate 114 and block the passage of the pulses PL, thereby halting delivery of the corrective pulses +CPX. This ends the pitch error correction along the X axis. Note that the corrective pulses +CPX for the correction in the positive direction were delivered in the foregoing because of the assumption CN>RC. However, when the inequality CN<RC is fullfilled the case owing to the corrective value set in register 106, the coincidence circuit 113 will open AND gate 115 to deliver the corrective pulses −CPX for negative correction along the X axis. The backward correction is then performed in the same manner as the forward correction until the equality CN=RC is restored.

A better understanding of the foregoing can be had by using numerical values to describe a corrective operation. Thus, for first, second and third sub-regions of space $SP_1$, $SP_2$, $SP_3$ which adjoin one another in the order named, let the corresponding corrective values be 10, 7 and 9, respectively. These values are stored in memory 101. When the table of the machine tool moves from the origin and enters the first sub-region of space $SP_1$ where the current position of the table is given by $(X_a, Y_a, Z_a)$, the numerical value "10" is read out of memory 101 and set in the register 106. CN is greater than RC so that the comparator circuit 113 opens AND gate 114 to permit the passage of ten corrective pulses −CPX (i.e., the oscillator output pulses PL) which correct the pitch error by applying a correction in the positive direction. Only ten corrective pulses are delivered because the pulses are coupled also to the reversible counter 112 whose content is consequently up-counted from zero to the numerical value "10" which is equivalent to the corrective value for the first subregion $SP_1$. This establishes the equality CN=RN, cl coupled also to the reversible counter 112 whose content is consequently up-counted from zero to the numerical value "10" which is equivalent to the corrective value for the first subregion $SP_1$. This establishes the equality CN=RN, closing the AND gate 114 and therefore interrupting the flow of pulses. Then, as the table is moved so that the commanded current position is located in the second sub-region of space $SP_2$, the numerical value "7" is set in register 106, and the comparator circuit 113 opens AND gate 115 since CN ("7") is now smaller than RC ("10"), i.e., CN <RC. The AND gate 115 therefore delivers three corrective pulses −CPX to correct the pitch error in the negative direction. The content of reversible counter 112, owing to the sign of the corrective pulses −CPX, is down-counted from "10" to the numerical value "7", which is the corrective value corresponding to the second sub-region $SP_2$. Next, when the current table position shifts to the third sub-region of space $SP_3$, the numerical value "9" is set in register 106, and the comparator 113 opens AND gate 114 since CN ("9") is now greater than RC ("7"). The AND gate 114 therefore delivers two corrective pulses +CPX to correct the pitch error in the positive direction. The content of reversible counter 112 is up-counted from "7" to "9", which is the corrective value corresponding to the third sub-region $SP_3$. Corrective operations for fourth and subsequent sub-regions proceed in similar fashion. Thus, a pitch error correction ends when the value of the count in reversible counter 112 agrees with the corrective value corresponding to the particular sub-region of space. It will also be appreciated that the value of the count in counter 112 is the arithmetic difference between the number of forward corrective pulses and the number of backward corrective pulses, and that this represents the actual correction factor. This enables pitch error to be corrected in an accurate manner.

When the AND gate 114 delivers the corrective pulses +CPX in the manner described above, the mixing circuit 13X in FIG. 1 adds pulses, equivalent in number to the pulses +CPX, to the distributed pulses $X_p$ produced by the interpolator 12, thereby increasing the total number of pulses applied to the servo circuit 14X. On the other hand, when the AND gate 15 delivers the corrective pulses −CPX, the mixing circuit 13X subtracts pulses, equivalent in number to the corrective pulses −CPX, from the distributed pulses $X_p$, thereby decreasing the total number of pulses applied to the servo circuit 14X. A corrective operation of this type is performed by pitch error correction circuit 17Y and pulse mixing circuit 13Y, and by pitch error correction circuit 17Z and pulse mixing circuit 13Z, thereby to correct the position of the table along all three control axes. This positional correction is executed each time the table moves from one sub-region of space to another.

Figure 3:
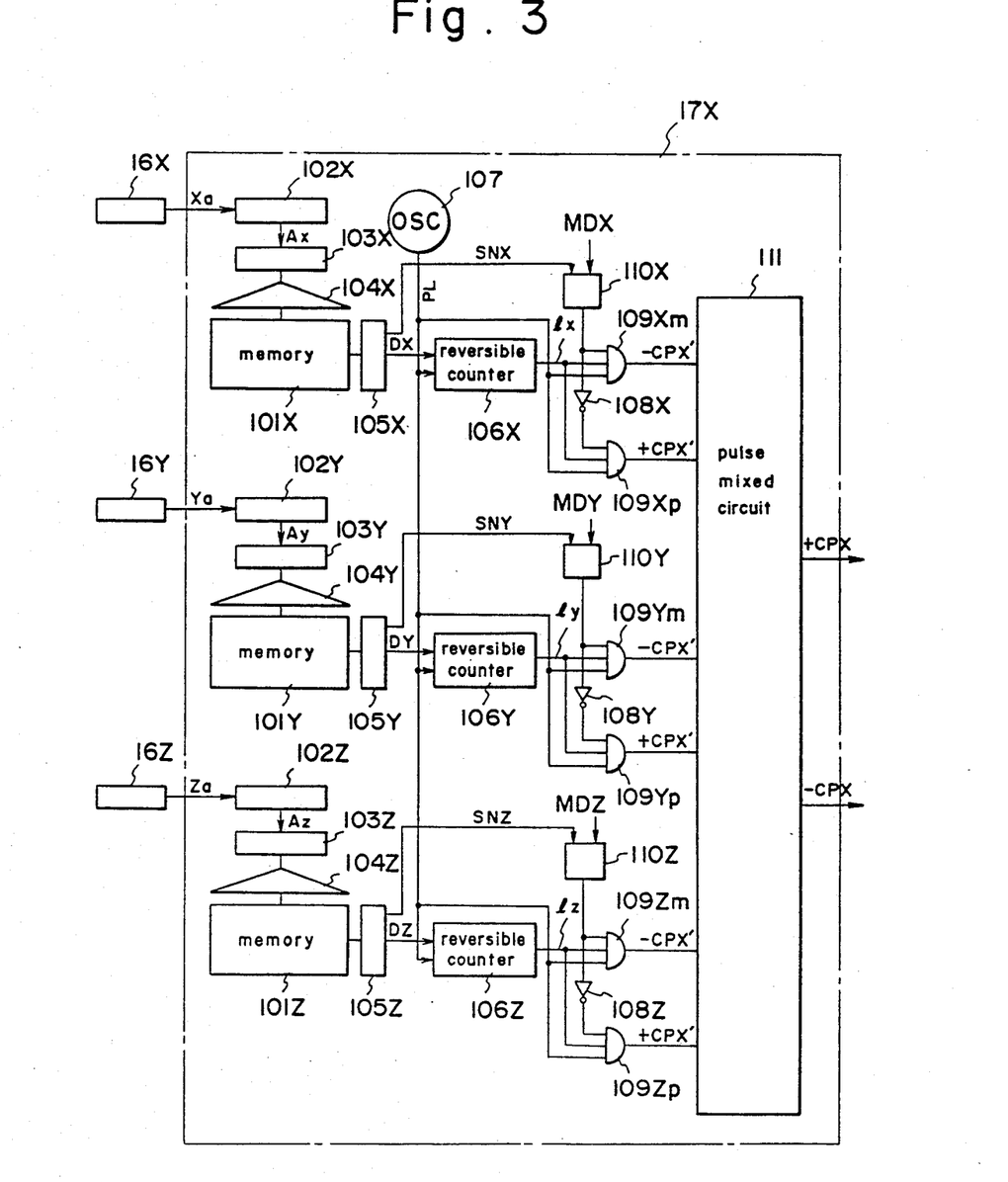
FIG. 3 is a block diagram illustrating another embodiment of a pitch error correction circuit in accordance with the present invention.

FIG. 3 is a block diagram useful in describing pitch error correction circuits 17X, 17Y, 17Z for a case where the pitch error correction factors $E_x$, $E_y$, $E_z$ may be expressed as follows:

$$E_x = f_x(x_a, y_a, z_a) = f_x(x_a) + g_x(y_a) + h_x(z_a)$$

$$E_y = f_y(x_a, y_a, z_a) = f_y(x_a) + g_y(y_a) + h_y(z_a)$$

$$E_z = f_z(x_a, y_a, z_a) = f_z(x_a) + g_z(y_a) + h_z(z_a)$$

The pitch error correction circuits 17X, 17Y, 17Z are identical in construction. Segments along the control axes may differ from one another, as may the corrective values assigned to respective segments and stored in memory, as will be described below. It will therefore be necessary to describe only one of the correction circuits, specifically the correction circuit 17X.

As shown in FIG. 3, pitch error correction circuit 17X includes memories 101X, 101Y, 101Z for storing the signed corrective values $f_x(x)$, $g_x(y)$, $h_x(z)$, respectively. The range of table movement along each of the X, Y and Z control axes is divided into a plurality of segments, and a corrective value is assigned to each segment. Corrective values, as well as their signs, corresponding to the segments along the X-axis are stored in memory 101X. Similarly, corrective values, as well as their signs, corresponding to the segments along the Y-axis are stored in memory 101Y, and corrective values, as well as their signs, corresponding to the segments along the Z-axis are stored in memory 101Z. Each corrective value is a so-called incremental corrective value. Accordingly, when the table moves to a position located on a certain segment, pulses are generated, as will be described below, for a correction in the positive or negative direction by an amount corresponding to the corrective value for said segment. The sign of the corrective value indicates the direction of the correction for a case where the table is moving in the positive direction. When the table is moving in the negative direction, therefore, the direction of the correction will be the reverse of the sign. Address converters 102X, 102Y, 102Z are provided for the respective memories 101X, 101Y, 101Z. The address converter 101X converts the current table position $X_a$ along the X-axis into an address $A_x$ corresponding to the segment to which $X_a$ belongs. Similarly, the address converters 101Y, 101Z convert the current positions $Y_a$, $Z_a$ along the Y and Z axes into addresses $A_y$, $A_z$ corresponding to the, segments to which $Y_a$ and $Z_a$ belong, respectively. The addresses $A_x$, $A_y$, $A_z$ are set in address registers 103X, 103Y, 103Z, respectively. Numerals 104X, 104Y, 104Z denote decoders, and numerals 105X, 105Y, 105Z denote read control circuits. Corrective values DX, DY, DZ, which have been read out of the respective memories 101X, 101Y, 101Z by the read control circuits, are preset in respective presettable reversible counters 106X, 106Y, 106Z, the content of each reversible counter being down-counted by one count each time an oscillator 107 generates a pulse. The reversible counters 106X, 106Y, 106Z have respective output lines $l_x$, $l_y$, $l_z$. A reversible counter delivers a "0" on its output line when its content is zero, and a "1" when its content is non-zero. Inverters are designated by 108X, 108Y, 108Z, and AND gates by 109Xp, 109Xm, 109Yp, 109Ym, 109Zp, 109Zm. Numerals 110X, 110Y, 110Z denote exclusive-OR gates whose respective inputs are the signs SNX, SNY, SNZ of the corrective values DX, DY, DZ, as well as directional signals MDX, MDY, MDZ. The signs SNX, SNY, SNZ are read out of the respective memories 101X, 101Y, 101Z along with the corrective values DX, DY, DZ. The directional signals MDX, MDY, MDZ indicate the direction of table movement. MDX is a "1" for table movement in the +X direction and a "0" for table movement in the −X direction, MDY is a "1" for table movement in the +Y direction and a "0" for table movement in the −Y direction, and MDZ is a "1" for movement in the +Z direction and a "0" for movement in the −Z direction. The signs SNX, SNY, SNZ are logical "1" when positive, and logical "0" when negative. Numeral 111 denotes a combining circuit which combines the positive corrective pulses +CPX' from the AND gates 109Xp, 109Yp, 109Zp and the negative corrective pulses −CPX' from the AND gates 109Xm, 109Ym, 109Zm, thereby to produce corrective pulses −CPX for a positive correction and corrective pulses −CPX for a negative correction.

In operation, the current position counters 16X, 16Y, 16Z store the current position of the table in terms of the values $X_a$, $Y_a$, $Z_a$ along the respective control axes X, Y, Z. The address converters 102X, 102Y, 102Z receive the values $X_a$, $Y_a$, $Z_a$ and convert them into addresses $A_x$, $A_y$, $A_z$ which correspond to the respective segments on which the above values lie. When the interpolator 12 in FIG. 1 generates the distributed pulses $X_p$ for moving the table in the +X direction, the distributed pulses are coupled to the servo circuit 14X through the pulse mixing circuit 13X to drive the servo motor 15X, whereby the table is transported in the +X direction. At the same time, the distributed pulses $X_p$ enter the counter 16X and increment its content. When the current position $X_a$ along the X-axis moves from one segment to the next adjacent segment, the address converter 102X generates the address $A_x$ corresponding to the latter segment and sets this address in the address register 103X, which now addresses the memory 101X accordingly. As a result, the read control circuit 105X reads, from the address $A_x$ of the memory 101X, the pitch error corrective value DX as well as its sign SNX, the corrective value DX being that which has been assigned to the segment just occupied by the commanded current position of the table. The read control circuit 105X presets the corrective value DX in the reversible counter 106X and applies the sign SNX (assumed here to be logical "1") to the exclusive-OR gate 110X. Since the content of counter 106X is now non-zero, a "1" appears on its output line $l_x$. Further, since the sign SNX is a "1" (positive) and the directional signal MDX is a "1" (indicating movement in the positive direction), the exlusive-OR gate 110X delivers a "0" which causes the AND gate 109Xp to open. The open gate 109X$_p$ permits the pulses PL generated by the oscillator 107 to enter the pulse mixing circuit 111 as the corrective pulses +CPX'. The content of reversible counter 106X is decremented by one count eacixing circuit 111 as the corrective The delivery of the corrective pulses +CPx' ends when the content of counter 106X is counted down to zero. When the sign SNX of the corrective value DX is positive (logical "1") and pulses are being distributed in the −X direction, so that the directional signal MDX is logical "0", the output of the exclusive-OR gate 110X is logical "1". Therefore AND gate 109Xm is opened instead of AND gate 109Xp and c delivers the corrective pulses −CPX', produced in the same manner as the corrective pulses +CPX' as described above.

The foregoing description deals with a pulse distribution operation solely along the X-axis. When pulses are distributed simultaneously along two control axes, or simultaneously along three control axes, the AND gates 109Yp, 109Ym, 109Zp, 109Zm also deliver the corrective pulses +CPX', −CPX' which enter the pulse mixing circuit 111 and are mixed with the distributed pulses, thereby to provide the corrective pulses +CPX, −CPX. The pitch error correction circuits 17Y and 17Z operate in the same manner as the pitch error correction circuit 17X to produce the corrective signals +CPY, −CPY, +CPZ, −CPZ.

It should be obvious from the foregoing description that the present invention enables pitch error to be corrected in accurate fashion to permit highly precise numerical control of a machine tool even when the pitch error along a certain control axis is dependent not only upon the current position along said control axis but upon the current position along the other control axes.

It should be understood that the foregoing description is a preferred embodiment of the disclosed invention and that various changes and modifications may made without departing from the spirit and scope of the invention. For example, it was described above that the corrective pulses are generated on the basis of the current position of the movable body, such as a table, following a command to move the body. However, it is possible to adopt an arrangement wherein the corrective pulses are generated on the basis of the actual position of the movable body as obtained by supplying the current position counters with signals that indicate where the movable body is actually located at any given time, irrespective of commands.

What we claim is:

1. A method of correcting a positional error in a numerical control system, with a memory, for controlling a machine tool having a movable member with a commanded position and movable in three dimensional space and having at least two control axes, the movable member being movable along at least two of said control axes and the movement of the member being controlled along at least two of said control axes, said method comprising the steps of:
    (a) dividing the three dimensional space, in which the movable member moves, for each of said at least two control axes, into corresponding pluralities of sub-regions;
    (b) storing in the memory a position correcting value derived from the position of the movable member along at least one other control axis for each of said sub-regions;
    (c) up-dating the commanded position of the movable member each time the movable member moves;
    (d) detecting when the current position of the movable member has shifted from one sub-region of space to a second sub-region of space;

(e) storing the position correcting value of said one sub-region of space which the movable member has just moved from;

(f) reading out of the memory the position correcting value corresponding to said second sub-region of space when the current position of the movable member is located in said second sub-region; and (g) correcting the position of the movable member along said one control axis in accordance with the arithmetic difference between the position correcting value of the second sub-region of space and the stored position correcting value of the one sub-region of space the movable member has just moved from.

2. A method of correcting a positional error in a numerical control system, with a memory, for controlling a machine tool having a movable member being movable in three dimensional space and having at least two control axes, the movable member being movable in the forward and backward direction along each of said at least two control axes and the movement of the movable member being controlled along said at least two control axes, said method comprising the steps of:

(a) dividing each of said control axes into a corresponding plurality of segments of movement;

(b) storing, in the memory corresponding pluralities of position correcting values for each of said control axes, the values being derived from the position of the movable member along one of said at least two axes and the position of the movable member along at least one other control axis;

(c) up-dating the current position of the movable member each time said movable member moves;

(d) detecting when the current position of the movable member has shifted from one segment to a second segment;

(e) reading out of the memory the position correcting value corresponding to said second segment when the current position of the movable member is a point located on said second segment;

(f) correcting the position of the movable member along said one control axis in accordance with said position correcting values stored in the memory; and (g) correcting the backward movement of the movable member along said one control axis in accordance with the negative of the correcting values stored in the memory.

3. A position error correction apparatus in a numerical control system for controlling a machine tool having a movable member movable along at least two axes and whose movement is controlled along at least two control axes, said apparatus including:

error correction circuits, each associated with a corresponding one of said control axes and generating corresponding correction factors in accordance with correctional values associated with the position of the movable member along one control axis, and correctional values associated with the position of the movable member along at least one other control axis, said error correction circuits providing corresponding output signals indicative of the corresponding correction factors, in response to a positional control operation along one of said control axes, and for correcting the positional error of the movable member.

4. A positional error correction apparatus in a numerical control system for controlling a machine tool having a movable member with a current position and at least two control axes, each axis comprising a plurality of control positions, wherein the movement of said movable member is controlled along at least two of said control axes, said apparatus comprising:

plural memory means, respectively associated with a corresponding one of said control axes, for respectively storing correctional factors for each of said plurality of control positions associated with said corresponding one of said control axes, each correctional factor for said corresponding one of said control axes comprising a function of correctional values associated with said corresponding one of said control axes, each of said correctional values specifying an amount of correction of said movable member attributable to the current position of said movable member with respect to said control axes;

reading means for reading said positional error correction factors out of said memory means in response to said movable member being positionally controlled along one control axis, each of said positional correction factors corresponding to a control position on said one control axis and to a control position on each of the other control axis; and position means for positionally controlling the movable member along said one control axis in accordance with the position error correction factor read out of said memory.

5. A positional error correction apparatus according to claim 4, wherein said apparatus further comprises:

receiving means for receiving direction signals indicating the direction of movement of said movable member along each control axis; and wherein said position means further comprises counting means operatively connected to said pulse generator circuit and to corresponding of said read circuits, for counting said pulse signals in accordance with said corresponding memory circuit, and for providing, as an output, a signal responsive to said counting;

mixing means operatively connected to said counting means, to each of said reading circuits, to said pulse generator circuit, and to said receiving means, for mixing said pulse signals and said output of said counting means in accordance with said direction signals and the output of said read circuits, and for prodiving, as an output, a signal for correcting the positional error of the movable member.

6. A positional error correction apparatus according to claim 5, wherein each of said read circuits further provides as an output, in accordance with the positional error correction factor read from said corresponding memory circuit, a signal indicating the direction of positional error correction of said movable member relative to the direction of movement of said movable member.

7. A positional error correction apparatus according to claim 4, wherein said reading means comprises a corresponding read circuit for each memory circuit, each read circuit provides as an output, the positional error correction factor read from said corresponding memory circuit, wherein said position means comprises a position circuit for each control axis and a pulse generator circuit for providing pulse signals.

8. A positional error correction apparatus according to claim 4, wherein said position means comprises:

temporary storage means operatively connected to said reading means for temporarily storing said positional error correction factor read out of said memory means, and for providing, as an output, a signal responsive to said storage correction factors;

pulse generator circuit for providing, as an output, pulse signals;

counting means operatively connected to said pulse generator circuit, for counting said pulse signals and providing, as an output, a signal responsive to said count;

comparison means operatively to said temporary storage means and to said counting means, for comparing the output of said temporary storage means and the output of said counting means, and providing, as an output, a signal indicating whether the output of said temporary storage means is greater than or less than the output of said counting means;

gating means operatively connected to said pulse generator and to said comparison means for gating said pulse signals in accordance with said output of said comparison means, and for providing, as an output, correction signals for correcting the positional error of the movable member, said signals indicating a positional error correction in the direction of movement of said movable member in response to the output of said temporary storage means being greater than the output of said counting means, and said signals indicating a positional error correction in the direction opposite to that of the movement of said movable member in response to the output of said temporary storage means being less than the output of said counting means.

* * * * *

UNITED STATES PATENT AND TRADEMARK OFFICE
CERTIFICATE OF CORRECTION

PATENT NO. : 4,514,813

DATED : April 30, 1985

INVENTOR(S) : Ryoichiro Nozawa et al

It is certified that error appears in the above-identified patent and that said Letters Patent is hereby corrected as shown below:

Column 5, line 14, "-CPX" should be --+CPX--;
line 21, delete "C1 coupled";
line 22, delete in entirety;
line 23, delete in entirety;
line 24, delete in entirety;
line 25, delete in entirety;
line 26, delete "CN=RN,".

Column 6, line 59, delete ",".

Column 7, line 27, "-CPX" should be --+CPX--;
line 67, delete "eacixing";
line 68, "circuit 111 as the corrective" should be --each time a pulse PL is generated.--.

Column 8, line 8, delete "c";
line 62, after "along" insert --one of said at least two axes and the position of the movable member along--.

UNITED STATES PATENT AND TRADEMARK OFFICE
CERTIFICATE OF CORRECTION

PATENT NO. : 4,514,813            Page 2 of 2

DATED : April 30, 1985

INVENTOR(S) : Ryoichiro Nozawa et al

It is certified that error appears in the above-identified patent and that said Letters Patent is hereby corrected as shown below:

Column 10, line 39, after "corresponding" insert --positional error correction factor read from said corresponding--;

Column 11, line 10, after "operatively" insert --connected--.

Signed and Sealed this

Twenty-fourth Day of September 1985

[SEAL]

Attest:

Attesting Officer

DONALD J. QUIGG

Commissioner of Patents and Trademarks—Designate